United States Patent [19]

Shaw

[11] Patent Number: 4,989,134
[45] Date of Patent: Jan. 29, 1991

[54] METHOD AND APPARATUS FOR ENHANCING DATA STORAGE EFFICIENCY

[75] Inventor: Robert A. Shaw, Los Altos, Calif.

[73] Assignee: Hewlett-Packard Company, Palo Alto, Calif.

[21] Appl. No.: 28,808

[22] Filed: Mar. 20, 1987

[51] Int. Cl.$^5$ .............................................. G06F 12/12
[52] U.S. Cl. ................................. 364/200; 364/281.1
[58] Field of Search ....................... 364/200, 900, 300

[56] References Cited

U.S. PATENT DOCUMENTS

| | | | |
|---|---|---|---|
| 4,660,130 | 4/1987 | Bartley et al. | 364/200 |
| 4,672,535 | 6/1987 | Katzman et al. | 364/200 |
| 4,755,939 | 7/1988 | Watson | 364/300 |
| 4,757,438 | 7/1988 | Thatte et al. | 364/200 |
| 4,758,944 | 7/1988 | Bartley et al. | 364/200 |
| 4,775,932 | 10/1988 | Oxley et al. | 364/200 |
| 4,797,810 | 1/1989 | McEntee et al. | 364/200 |
| 4,807,120 | 2/1989 | Courts | 364/200 |
| 4,814,971 | 3/1989 | Thatte | 364/200 |
| 4,853,842 | 8/1989 | Thatte et al. | 364/200 |

OTHER PUBLICATIONS

O. Baboglu and W. Joy, "Converting a Swap-Based System to do Paging in an Architecture Lacking Page-Referenced Bits", *Proceedings of the Eighth Symposium on Operating Systems Principles*, Pacific Grove, CA, 1981, 78-86.

H. Baker, "List Processing in Real Time on a Serial Computer", *Communications of the ACM*, vol. 21, 4 (Apr. 1978), 280-294.

S. Ballard and S. Shirron, "The Design and Implementation of VAX/Smalltalk-80", *Smalltalk-80: Bits of History, Words of Advice*, G. Krasner (editor), Addison Wesley, 1983, 127-150.

C. Cheney, "A Nonrecursive List Compacting Algorithm", *Communications of the ACM*, vol. 13, 11 (Nov. 1970), 677-678.

D. Clark and C. Green, "An Empirical Study of List Structure in Lisp", *Communications of the ACM*, vol. 20, 2 (Feb. 1977), 78-87.

P. J. Denning, "The Working Set Model for Program Behavior", *Communications of the ACM*, vol. 11, 5 (May 1968), 323-333.

P. J. Denning, "Virtual Memory", *Computing Surveys*, vol. 2, 3, (Sep. 1970), 153-189.

L. P. Deutsch and D. Bobrow, "An Efficient Incremental Automatic Garbage Collector", *Communications of the ACM*, vol. 19, 9 (Sep. 1976), 522-526.

R. Fenichel and J. Yochelson, "A LISP Garbage-Collector for Virtual-Memory Computer Systems", *Communications of the ACM*, vol. 12, 11 (Nov. 1969), 611-612.

(List continued on next page.)

Primary Examiner—Eddie P. Chan
Assistant Examiner—Maria Napiorkowski
Attorney, Agent, or Firm—William H. F. Howard; Paul L. Hickman

[57] ABSTRACT

The present invention improves the interaction of a virtual memory systems and a garbage collection system, thereby reducing garbage collection effort and improving virtual memory performance. The method includes the steps of: (1) developing a secondary memory (e.g. disk) dirty page map; (2) developing a saved state map from a primary memory (e.g. RAM) dirty page map; (3) using the secondary memory dirty page map and the primary memory dirty page map to effectively reduce the size of the base set; (4) performing a garbage collection routine on at least a segment of the heap based upon the effectively reduced base set; and (5) performing a virtual memory routine using the primary memory dirty page map and the saved state map. The apparatus of the present invention implements the method on a digital computer system with a combination of hardware and software.

9 Claims, 8 Drawing Sheets

OTHER PUBLICATIONS

J. Foderaro and R. Fateman, "Characterization of VAX Macsyma", *Proceedings of the 1981 ACM Symposium on Symbolic and Algebraic Computation*, Berkeley, CA, 1981, 14–19.

H. Lieberman and C. Hewitt, "A Real-Time Garbage Collector Based on the Lifetimes of Objects", *Communications of the ACM*, vol. 26, 6 (Jun. 1983), 419–429.

D. Moon, "Garbage Collection in a Large Lisp System", *ACM Symposium on Lisp and Functional Programming*, Austin, TX, 1984, 235–246.

P. Rovner, On Adding Garbage Collection and Tuntime Types to a Strongly-Typed, Statistically-Checked, Concurrent Language, CSL-84-7, Xerox PARC, Palo Alto, CA, 1985.

C. Steele, Common Lisp, The Language, Digital Press, p. 465, 1984.

P. Steenkiste and J. Hennessey, "LISP on a Reduced-Instruction-Set Processor", *Proceedings of the 1986 ACM Conference on Lisp and Functional Programming*, Cambridge, MA, 1986, 192-201.

G. Taylor, P. Hilfinger, J. Larus, D. Patterson, and B. Zorn "Evaluation of the SPUR Lisp Architecture", *Proceedings of the Thirteenth Symposium on Computer Architecture*, Tokyo, Japan, 1986, 444–452.

D. Ungar, *The Design and Evaluation of a High Performance Smalltalk System*, PhD. Thesis, UC Berkeley, UCB/CSD 86/287, Mar. 1986.

J. White, "Address/Memory Management for a Gigantic LISP Environment or, GC Considered Harmful", *Conference Record of the 1980 LISP Conference*, Redwood Estates, CA, 1980, 119–127.

P. Caudill, "A Third Generation Smalltalk-80 Implementation", *OOPSLA'86 Proceedings, Association for Computer Machinery* (ACM), Sep. 1986.

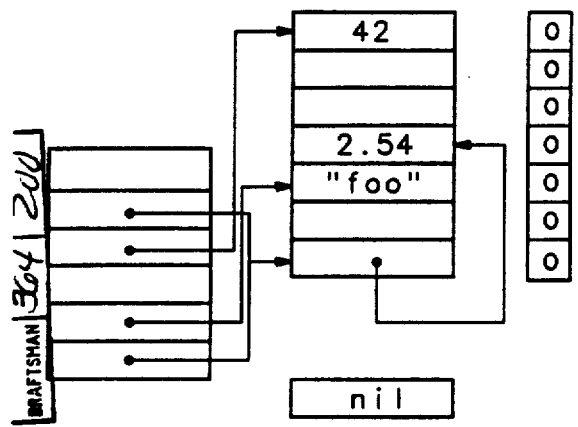
FIG 1A
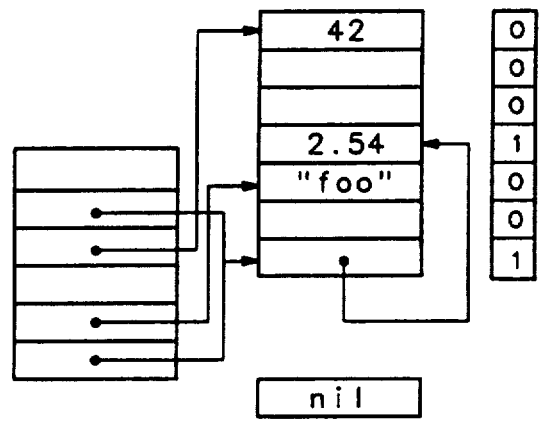
FIG 1B
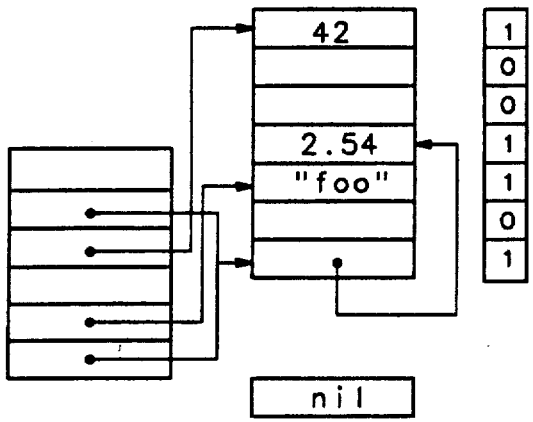
FIG 1C
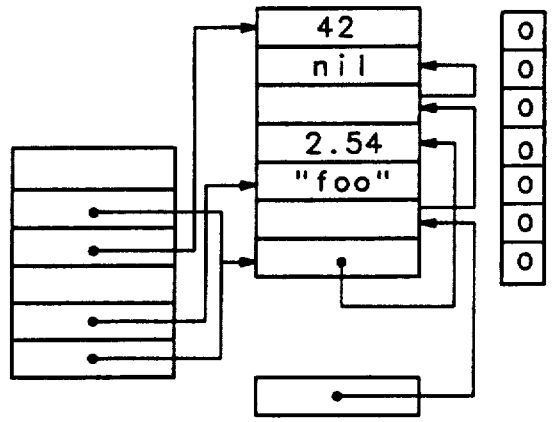
FIG 1D
FIG 1 (PRIOR ART)

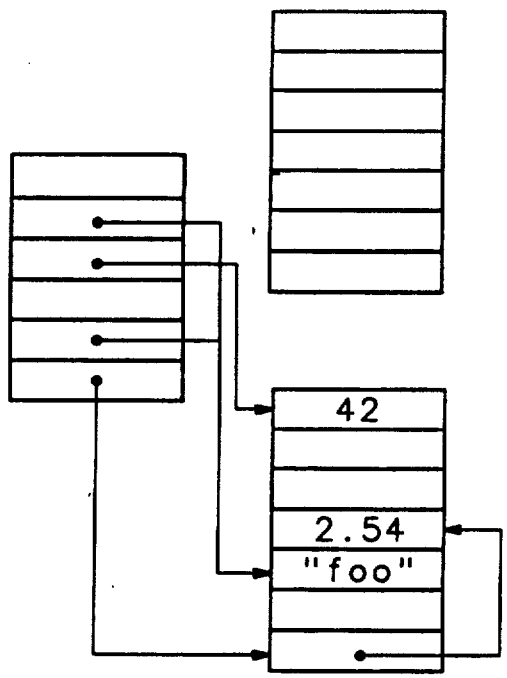
FIG 2A
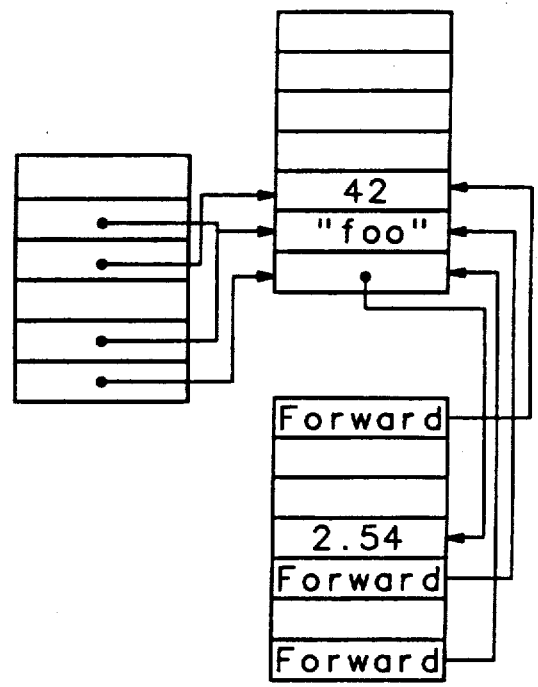
FIG 2B
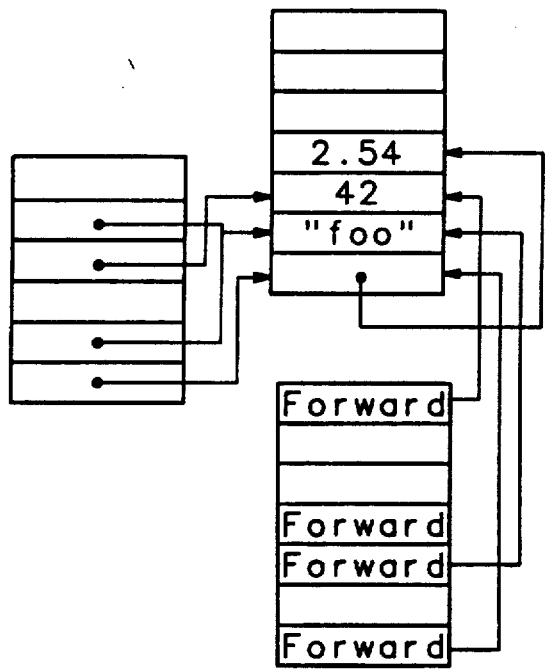
FIG 2C
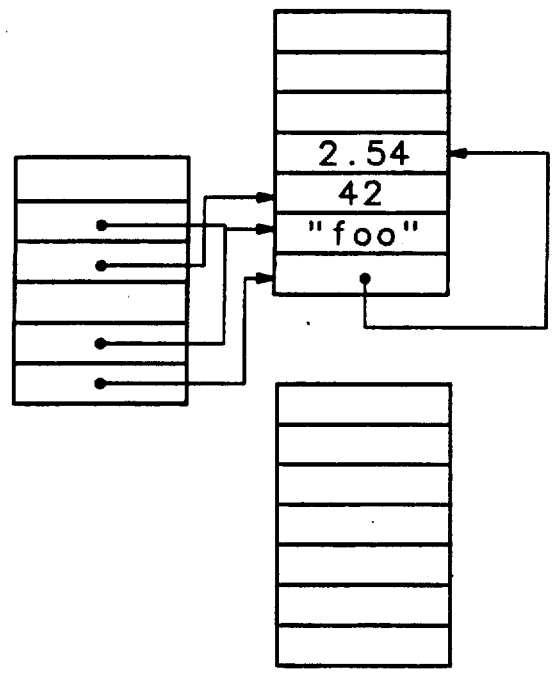
FIG 2D
FIG 2 (PRIOR ART)

METHOD AND APPARATUS FOR ENHANCING DATA STORAGE EFFICIENCY

BACKGROUND OF THE INVENTION

1. Field of the Invention

This invention relates generally to digital computers, and more particularly to methods and systems for optimizing the efficient use of digital computer memories.

2. Description of the Prior Art

Large digital computer systems often employ specialized hardware and/or software routines to optimize memory system characteristics or performance. Among these routines are two known as garbage collection and virtual memory.

The goal of garbage collection is to recover usable address space that is no longer being utilized by the application program. By increasing data density via garbage collection, system performance is increased by lowering memory access time, and cost is decreased by reducing required primary (e.g. RAM) and secondary memory (e.g. disk) capacity.

Virtual memory permits a user to access secondary memory as if it were primary memory. As such, virtual memory frees the user from concerns as to the size limitations of the primary memory.

Although both garbage collection and virtual memory free the user of unwanted work, they do so at the cost of additional computation. Unfortunately, the computations required for garbage collection are generally incompatible with the computations required for virtual memory, resulting in poor interaction between the two routines. The reason for this is that virtual memory minimizes its computational load by exploiting a general observation about program execution: instruction and data references tend to be localized to reasonably small areas of the address space, while garbage collection saves the user effort by searching through every data object in the system to locate those which are no longer in use. Consequently, garbage collection violates the foundation upon which virtual memory depends. A user pays for this poor interaction between garbage collection and virtual memory with long interruptions in computation during which memory is being moved back and forth between primary and secondary memories in a process known as "thrashing".

For the following discussion of garbage collection and virtual memory techniques, it will be useful to define some terminology. "Data memory" will refer to the area where essentially all data or data objects reside. "Data objects" are the structures containing the actual information to be processed by the program. Data objects can be stored in the execution stack(s) and in processor registers as well as in data memory, such as the system RAM. Examples of data objects are Lisp CONS cells, vectors, or bignums.

"References" identify data objects and provide a uniform and efficient way for handling them. Efficiency can be gained by passing around constant-sized references rather than arbitrary-sized data objects.

Data memory is broken into a dynamic area and a static area. The dynamic area will be called the "heap". For the purposes of this paper, a heap will always be considered to be a reasonably large contiguous area of memory. Storage in the heap is allocated for new data objects as the user's application program creates them.

The static area of data memory will be called the "base set". In a Lisp system, the base set consists of data objects referred to by code or objects such as symbols which must always be available. Data objects and references contained in the stack(s) and registers are usually also considered part of the base set.

A data object is considered to be "live" as long as it can be reached through some chain of references originating in the base set. The storage associated with live data objects must not be reclaimed. Only data objects in the heap are subject to reclamation; data objects in the base set can never die.

A "minimal base set" will be used to denote only the set of references from the base set into the heap. References which do not point into the heap, and self-contained data in the base set, are not considered part of the minimal base set. Duplicate references from the base set into the heap constitute separate entries in the minimal base set.

There are a number of classical garbage collection schemes in existence. While they vary in complexity and effectiveness, all garbage collection schemes include the steps of: (1) identifying the live and/or dead data objects; and (2) recovering the storage associated with the dead data objects.

One type of garbage collection is known as "reference counting". Reference counting systems attempt to identify the point at which the data object is no longer live by noting when the last reference to the data object is lost. This is accomplished by incrementing a counter, the "reference count," associated with each data object each time a reference to it is created, and decrementing the counter each time a reference is lost. References are created and lost through assignment or the creation and destruction of environments. When the reference count reaches zero, the data object is no longer referenced and its storage may be reclaimed.

Reference counting has the desirable feature that garbage collection is accomplished at the earliest possible moment. Furthermore, the reclamation is spread out through time rather than being lumped into a single long, and potentially disruptive, operation. On the negative side, reference counting cannot reclaim dead data objects linked into a circular structure nor data objects whose reference counts have overflowed. Also, the computational effort expended with reference counting is proportional to the number of dead data objects in the system's memory, placing large demands upon the system CPU.

Another garbage collection scheme is known as the "mark and sweep" collector. With reference to FIG. 1, storage is allocated from a "free list", i.e. a list of free storage spaces in the heap, until some minimum threshold of available storage is reached. Upon reaching this threshold, the user computation is stopped and garbage collection begins (see FIG. 1a). The base set is first traversed to find all data objects that are recursively reachable. When an object in the heap is encountered for the first time, it is marked. Then all objects in the heap which are recursively reachable from the object are traversed and marked, if not already marked. Marking usually involves setting a bit associated with the data object to indicate that it is live. FIG. 1b shows the state of the mark bits after the bottom element of the base set and those data objects recursively reachable from it have been traversed and marked. Should a marked object be encountered later through some other chain of references, the fact that it is marked will prevent further effort from being expended in traversing the object and those reachable from it. When all reachable objects have been marked, the mark phase ends and the sweep phase begins, as illustrated in FIG. 1c.

At this point in the mark and sweep garbage collection scheme, it is known that all live objects in the heap have been marked and that any unmarked objects are dead. The sweep phase recovers the storage used by dead data objects by linearly sweeping the heap looking for unmarked data objects. When a live object is encountered, the mark associated with it is cleared. When a dead object is encountered, the storage associated with it is placed on a free list. At the end of the sweep, the garbage collection is complete and the user computation may be resumed (FIG. 1d).

The benefits of a mark and sweep collector are that no dead structure can survive a garbage collection, data need not be moved (which may be important in some systems), and that the entire space allocated to the heap can be used for data. A negative aspect of mark and sweep collectors is that memory fragmentation can become a serious problem unless compaction or elaborate multi-space allocation is done. Also, compaction must be an atomic operation since the data memory is inconsistent during that time (barring complex schemes which will degrade system performance) and, because of the multiple garbage collection phases, accesses of the same location are guaranteed to occur at substantially disjoint points in time. This can have substantial bearing on the virtual memory performance.

Yet another garbage collections scheme is known as "stop and copy" which works by copying live data objects from the space being collected into an unused space. With reference to FIG. 2, this scheme "divides" the heap into two equally-sized spaces. All allocation takes place from one of the spaces known as "FromSpace". The second space, known as "ToSpace" remains empty until garbage collection begins. When there is no more room in FromSpace, the user computation is stopped and garbage collection begins (FIG. 2a). The base set is traversed looking for references into FromSpace. When one is found, a check is made to see if there is a "forwarding pointer" where the data object should be. A forwarding pointer is used by the collector to indicate the new location of a moved data object. If there is a forwarding pointer, the original reference is updated to point where specified by the forwarding pointer and the base set traversal is continued. If the data object is in FromSpace, it is copied to the next available location in ToSpace, a forwarding pointer is placed at the old location in FromSpace to indicate where the data object was copied to, and the original reference is updated to reference the moved data object (FIG. 2b).

When the base set has been fully traversed, ToSpace can be scanned linearly looking for references from copied objects into FromSpace. As references are found into FromSpace, the data objects are copied to ToSpace (if they have not already been copied) and the reference is updated to reflect the new location. Since ToSpace is scanned from the same end that allocation first occurred and the scan is in the direction of new allocation, data objects copied during the scan will always be placed at the end of ToSpace where scanning has yet to happen. When the scanning pointer reaches the new allocation pointer, the garbage collection is complete (FIG. 2c).

There should no longer be any reference into FromSpace; all that remain are dead objects and forwarding pointers. FromSpace and ToSpace are interchanged and the user computation can continue. The interchange of the spaces reclaims all space in FromSpace for use as ToSpace during the next collection (FIG. 2d). The classical version of the algorithm described permits only half of the available dynamic data memory to be allocated before a garbage collection must take place; the second half of the memory remains idle and empty, waiting for copying to occur.

A virtual memory expense that might be excessive in the stop and copy scheme is that of having to actually access the heap when a reference to FromSpace is encountered. The least predictable accessing in garbage collection is that involved with marking or checking to see if a data object needs to be copied. If there were only one reference in existence for each data object, the same number of heap references would be required for either scheme. However, there is often more than one reference to a data object. In the mark and sweep scheme, a small table of mark bits can be used to avoid actually making accesses to a large heap for any but the first reference mark encountered. The stop and copy scheme essentially requires making these fairly random heap accesses to obtain the forwarding information.

The stop and copy scheme does have several advantages. Its implementation is quite simple, as there are no tricky tables to build and no elaborate techniques necessary to achieve recursions without using large amounts of space. In the simplest case, in which the base set is a single contiguous block, a linear scan of it followed by a linear scan of ToSpace will accomplish the entire traversal of all live objects.

Another nice feature of this scheme in virtual memory is that each reference is touched only once. While a compacting mark and sweep collector needs to access each reference once to initiate marking and once to relocate the reference after compaction has occurred, the stop and copy scheme combines these phases into a single pass, potentially reducing virtual memory paging by a factor of two.

Another aspect of the stop and copy scheme which has added to its attractiveness is its ability to be converted into an incremental algorithm. Since the heap can be guaranteed to be consistent by making the run-time systems cognizant of forwarding pointers and by making the copying of data objects and storing of forwarding pointers atomic, garbage collection can be distributed over long periods.

Prior art garbage collection schemes such as those described above tend to be slow and disruptive. Interruptions due to non-reference counted garbage collection are viewed as unwelcome distractions that impede progress and destroy trains of thought. As such, much research has been conducted into ways for reducing the time spent in garbage collection.

A logical starting point for speeding up garbage collection is to compress key information into small tables and to make memory accesses more orderly. For example, allocating objects in the base set such that they are physically contiguous (i.e. they may be linearly rather than randomly scanned) and using compact tables of mark bits rather than mark bits spread through memory can improve virtual memory performance.

Modifications such as those mentioned above can result in substantial improvements, but do not address a key problem. Garbage collectors historically must deal with, at a minimum, every live object in the system during a collection. This includes all the data structures used by those programs which were created but rarely, if ever, used. Requiring the collector to access and possibly move all this relatively stable structure takes time that would be better spent on user computation. In a worst case scenario, it is possible that the entire user computation must be moved out of primary memory to make room for the relatively stable structure which must be traversed during garbage collection.

Another approach to speeding up garbage collection involves the real or apparent reduction in size of the base set and/or heap. It is readily apparent that garbage collection in a system with a small base set and heap would be faster than garbage collection in a system with a large base set and heap. In fact, if the total space occupied by the base set and the heap is less than the primary memory size, it might be possible to accomplish the entire garbage collection routine without any virtual memory paging, resulting in enormous performance gains. Pragmatically, however, reducing the size of data memory available in the system is not a popular issue with most users, particularly since reduced data space is considered to be a disadvantage with the stop and copy garbage collection approach. A solution, then, is to make the base set and heap appear to be smaller to the garbage collector, but not to the user.

Recent work has suggested that effort spent in garbage collection can be reduced by making use of two simple heuristics which depend upon knowledge of the age of an object: (1) The mortality rate among newly created objects is substantially higher than that of older objects; and (2) References contained in an object tend to identify previously created objects.

The first heuristic leads to a reduction in effort by reducing the size of the heap to be collected. The reduction results from noting that newly allocated areas tend to yield the highest ratio of dead to live objects. By focusing the effort on regions of newly allocated objects where the mortality rate is expected to be high, the size of the heap is effectively lessened. The older portion of the heap can be temporarily absorbed into the base set. Only dead data objects in the newer part of the heap are reclaimed, dead objects that are contained in the older part of the heap are not reclaimed and may artificially prolong the life of some objects in the newer part.

Tests indicate that a 30% improvement is experienced with both compacting mark and sweep and stop and copy garbage collectors when modified as described above. A first reason for this speed-up is that the reduction in size of the collectable heap makes it possible to avoid much of the marking or copying that would normally happen. The entire base set is to be traversed, so pointers into the base set are not recursively followed. Thus, no effort is spent following pointers into the stable part of the heap; the stable heap will be traversed as part of the base set. A second reason for the speed-up is that the randomness of access has been reduced substantially. Random accesses into the stable heap dictated by the base set are replaced by a linear sweep of the stable heap. Basically, work has been reduced by replacing decision (involving which objects are live in the stable heap) with definition, and by imposing order on an otherwise chaotic accessing pattern.

On the negative side, it is still necessary to look through the entire base set to find references into the reduced heap. The price being paid is that of looking through every single data object that could ever be used by any program that was ever loaded into the system.

The second heuristic says that the base set can be reduced. This is done by noting that when data objects are created they are initialized to reference other data objects which already exist. It is quite hard to reference something which has yet to be created. Therefore, there is a tendency for references to point backward in time. Of course, it is possible for an old object to be modified to reference a newer object, but empirically that is the exception to the rule. Thus, to garbage collect a particular portion of the heap, it is only necessary to look for references in newer parts of the heap and in places where older parts of the heap have been modified to reference the newer parts.

Very few of the variations of garbage collectors discussed so far preserve information regarding order of creation (i.e. relative age) of objects across a collection. Using the heuristics requires having some knowledge of this age information.

It is useful to differentiate more than old and new objects; there needs to be multiple age groups. In one scheme it is suggested that the heap be broken into many smaller subheaps, each of which is associated with an "age". By maintaining a table (or entry vector) of older locations which have been modified to point into each younger subheap, the base set for a given subheap can be reduced to the entry vector plus younger subheaps.

Unfortunately, by looking through newer areas of the heap to find references into older areas of the heap, there will be scanning of a substantial percentage of dead objects that will be treated as live. Based on the heuristics, under normal circumstances it would be unwise to do a collection of some middle-aged subheap since it is the youngest subheaps that contain the bulk of the reclaimable space. If a subheap other than the youngest is to be collected, probably the best approach is to collect it at the same time younger areas are being collected.

Another scheme known as "generation scavenging" breaks the heap into several logical (not physical) subheaps or "generations". Each reference contains a "generation tag" which identifies the age of the data object. When a reference to a newer generation is stored in an older generation data object, the location of the older data object is added to an entry vector known as the "remembered set". At garbage collection time, the remembered set acts as the base set for the younger generations. By reducing the size of the base set which needs to be searched, the amount of paging that needs to take place will, in all likelihood, be reduced. If garbage collections occur frequently enough, the base set to be searched can be contained totally within the memory resident working set.

Generation scavenging employs an interesting memory layout to help minimize paging. The dynamic memory is broken into an "old area" and a "new area". Objects are always created in the new area. When an object has survived for a sufficiently long time, it is moved from the new area to the old area. Old area objects are considered fairly stable. Only occasional garbage collection is performed on objects in the old area; during normal execution only the new area is collected. By moving objects to the old area, the heap size can be reduced.

The new area of the heap can be broken into three areas: "NewSpace", "PastSurvivorSpace", and "FutureSurvivorSpace". PastSurvivorSpace and FutureSurvivorSpace perform much the same functions as FromSpace and ToSpace in the stop and copy collector. During a collection, live objects in PastSurvivorSpace are moved to FutureSurvivorSpace. When the collection is complete, the two spaces are switched in preparation for the next collection.

NewSpace is used to avoid excessive virtual memory paging. Rather than allocate new objects in PastSurvivorSpace as would be done in a classic stop and copy scheme, all new objects are allocated in NewSpace. By keeping the new allocation local to NewSpace, the pages always used for new allocation stand a good chance of remaining memory resident. It is not necessary to move the allocation area back and forth as PastSurvivorSpace and FutureSurvivorSpace are switched following collections.

During a collection live objects in NewSpace are moved to FutureSurvivorSpace. Indeed, by careful layout of the area for new allocation, generation scavenging avoids gratuitous paging and permits the partial collections to be run unnoticed during interactive sessions.

References contain the age information in a generation tag, so data objects of different generations may be freely mixed in PastSurvivorSpace without fear of losing track of the age of any individual object. When an object survives a given number of collections, its generation data is modified to indicate that it has gotten older. When the tag shows that the object is old enough, it is moved to the old area in a process known as "tenuring".

Another method to increase performance of garbage collection is known as the "ephemeral collector". Ephemeral collection is an incremental scheme which utilizes hardware to maintain the entry vectors and to decrease effort necessary to deal with the non-uniformity resulting from the interleaving of the user computation (mutator) with the garbage collector (transporter and scavenger).

Much like generation scavenging, ephemeral collection is based upon a two space copying scheme modified to deal with reduced heap and base set size. The ephemeral collector supports two categories of dynamic data (dynamic and ephemeral) and a single category of static data. Dynamic objects can be viewed as either the tenured objects of generation scavenging, or as a third, intermediate lifetime generation.

Within the category of ephemeral, or short lifetime objects, are several "levels" which indicate the age of an object. The level of an object is derivable from its address through the use of a table; no bits in the reference are needed to encode the age. As an object survives collections it moves to higher levels until it is finally moved to the category of a dynamic object. The ephemeral collector provides for fine grained control over which levels are being collected at any time.

Hardware is used to maintain the entry vector for the ephemeral regions. When a store occurs, the hardware (the "barrier") which monitors the bus looks at the value being stored. If the tag of the data indicates that the data is a reference, and from looking at the address contained in the reference it is known that this reference is into an ephemeral area, then a mark is made in a page table (GCPT) to indicate that the page being written contains a reference into ephemeral space. Should it be necessary to remove a page from physical memory to make room for another page, the system software searches the page looking for references in ephemeral space. If any are found, the page and level of ephemeral object referenced are recorded in a B* tree (ESRT).

The GCPT and ESRT define the base set to be used during collection of any level of ephemeral object. The difference between the remembered set of generation scavenging and the GCPT and ESRT of the Ephemeral collector is in the way they are maintained (in-line code vs. hardware) and in the detail of information being kept. The remembered set contains specific objects in the base set. The GCPT and ESRT identify an object according to the page containing it. Because entire pages can be scanned quickly, the detail of exactly which object contains the possible reference of interest is not believed to be necessary.

The suggestions discussed above have all pointed out ways to increase performance of garbage collection. They are all based on reducing the heap to be collected and the base set to be traversed. Each of these schemes promises a solution to the problem of garbage collector performance, but there is a price to be paid. The ephemeral collector requires new hardware, the barrier and GCPT to be present in a tagged architecture to record references from region to region. Generation scavenging has been shown effective in systems running on conventional hardware, but requires a new tag in each reference. The cost in additional tag handling and reduced address range, along with the effort needed to maintain the remembered set, may make generation scavenging impractical for many new or existing implementations.

The following references are considered to be of interest as representative background art:

(1) O. Babaoglu and W. Joy, "Converting a Swap-Based System to do Paging in an Architecture Lacking Page-Referenced Bit 3", *Proceedings of the Eighth Symposium on Operating Systems Principles*, Pacific Grove, Calif., 1981, 78-86.

(2) H. Baker, "List Processing in Real Time on a Serial Computer", *Communications of the ACM*, Vol. 21, 4 (April 1978), 280-294.

(3) S. Ballard and S. Shirron, "The Design and Implementation of VAX/Smalltalk-80", in *Smalltalk-80: Bits of History, Words of Advice*, G. Krasner (editor), Addison Wesley, 1983, 127-150.

(4) C. Cheney, "A Nonrecursive List Compacting Algorithm", *Communications of the ACM*, Vol. 13, 11 (November 1970), 677-678.

(5) D. Clark and C. Green, "An Empirical Study of List Structure in Lisp", *Communications of the ACM*, Vol. 20, 2 (February 1977), 78-87.

(6) P. J. Denning, "The Working Set Model for Program Behavior", *Communications of the ACM*, Vol. 11, 5 (May 1968), 323-333.

(7) P. J. Denning, "Virtual Memory", *Computing Surveys*, Vol. 2, 3 (September 1970), 153-189.

(8) L. P. Deutsch and D. Bobrow, "An Efficient Incremental Automatic Garbage Collector", *Communications of the ACM*, Vol. 19, 9 (September 1976), 522-526.

(9) R. Fenichel and J. Yochelson, "A LISP Garbage-Collector for Virtual-Memory Computer Systems", *Communications of the ACM*, Vol. 12, 11 (November 1969), 611-612.

(10) J. Foderaro and R. Fateman, "Characterization of VAX Macxyma", *Proceedings of the 1981 ACM Symposium on Symbolic and Algebraic Computation*, Berkeley, Calif., 1981, 14-19.

(11) H. Lieberman and C. Hewitt, "A Real-Time Garbage Collector Based on the Lifetimes of Objects", *Communications of the ACM*, Vol. 26, 6 (June 1983), 419-429.

(12) D. Moon, "Garbage Collection in a Large Lisp System", *ACM Symposium on Lisp and Functional Programming*, Austin, Tex., 1984, 235-246.

(13) P. Rovner, *On Adding Garbage Collection and Runtime Types to a Strongly-Typed, Statistically-Checked, Concurrent Language*, CSL-84-7, Xerox PARC, Palo Alto, Calif., 1985.

(14) G. Steele, *Common Lisp, The Language*, Digital Press, 465 pp., 1984.

(15) P. Steenkiste and J. Hennesssy, "LISP on a Reduced-Instruction-Set-Processor", *Proceedings of the 1986 ACM Conference on Lisp and Functional Programming*, Cambridge, Mass., 1986, 192-201.

(16) G. Taylor, P. Hilfinger, J. Larus, D. Patterson, and B. Zorn, "Evaluation of the SPUR Lisp Architecture", *Proceedings of the Thirteenth Symposium on Computer Architecture*, Tokyo, Japan, 1986, 444-452.

(17) D. Ungar, *The Design and Evaluation of a High Performance Smalltalk System*, PhD. Thesis, UC Berkeley, UCB/CSD 86/287, March 1986.

(18) J. White, "Address/Memory Management for a Gigantic LISP Environment or, GC Considered Harmful", *Conference Record of the 1980 LISP Conference*, Redwood Estates, Calif., 1980, 119-127.

SUMMARY OF THE INVENTION

Garbage collection and virtual memory have long been in an adversarial relationship. Implementors of virtual memory systems have cited garbage collectors as an excellent test case for undermining page replacement algorithms, and users of Lisp systems have turned off garbage collection (and suffered the consequences) rather than live with the slowdown of garbage collector paging.

The present invention describes methods and apparatus which allow garbage collectors and virtual memory systems to work together to improve overall system performance. By using an uncomplicated layout for storage and information already maintained by most virtual memory systems, a garbage collector can substantially reduce the amount of effort necessary to reclaim a large majority of the available space. The invention requires no special hardware and minimal disruption of the runtime environment.

Briefly, the apparatus of the present invention includes: a primary memory including a base set area and a heap area; a primary memory dirty page map; a secondary memory; a secondary memory dirty page map; effective base set reducing means responsive to the primary and secondary dirty page maps; and garbage collection means responsive to the effectively reduced base set and operative to remove any un-referenced data from the heap. The method of this invention is analogous to the above-described apparatus.

With the present invention, most of the benefits of schemes such as Lieberman and Hewitt. supra, generation scavenging, and ephemeral collection are realized while providing the additional advantages of being reasonable easily graftable onto many existing stock systems, being only minimally disruptive of the system at runtime, and actually benefiting from the existence of virtual memory.

These and other objects and advantages of the present invention will become apparent to those skilled in the art after reading the following descriptions and studying the various figures of the drawing.

BRIEF DESCRIPTION OF THE DRAWINGS

FIG. 1(a-d) illustrates a prior art mark and sweep garbage collection routine.

FIG. 2(a-d) illustrates a prior art stop and copy garbage collection routine.

DETAILED DESCRIPTION OF THE PREFERRED EMBODIMENTS

Figure 3:
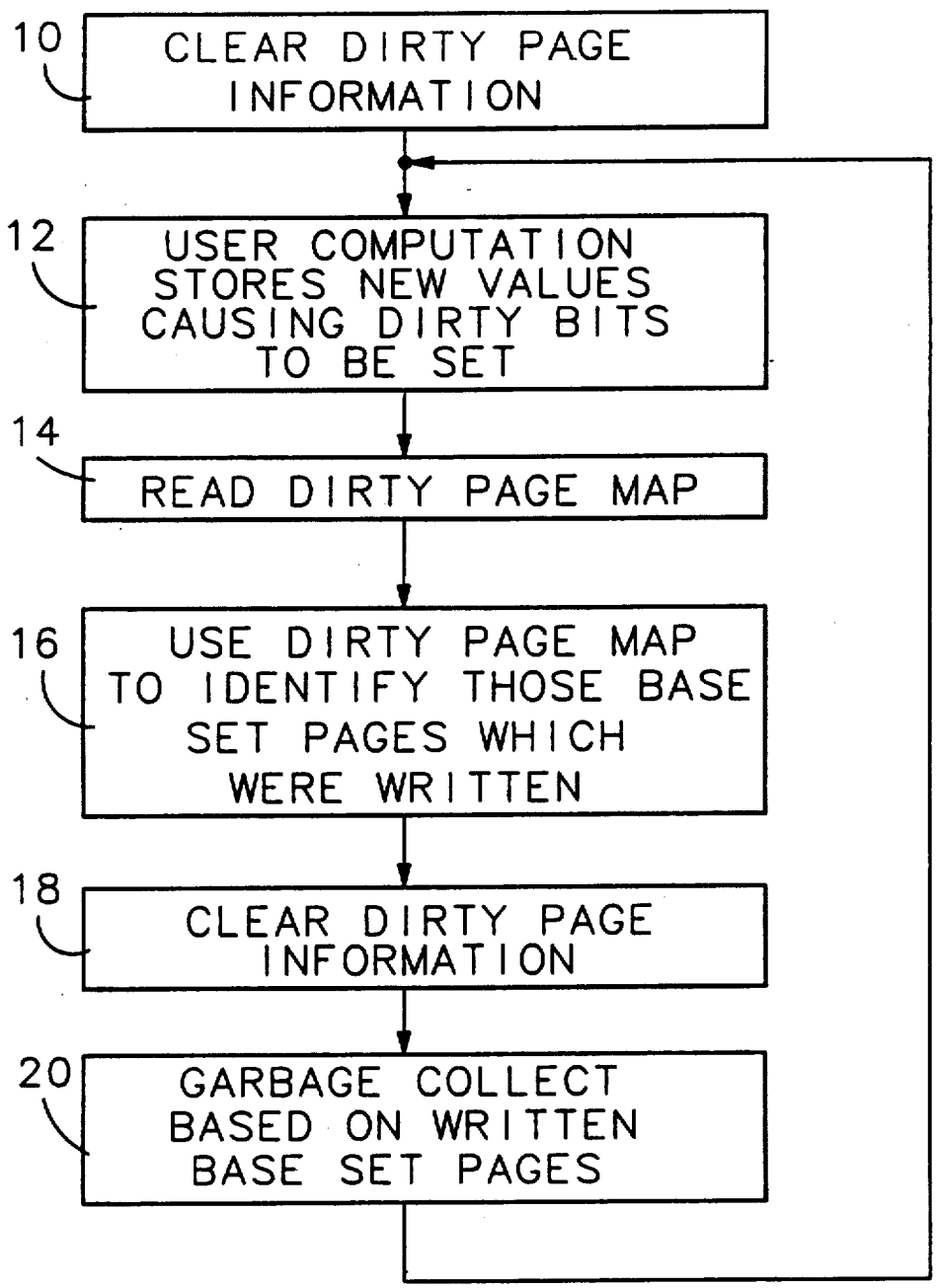
FIG. 3 is a flow-chart illustrating a garbage collection routine in a virtual memory system in accordance with the present invention.

The methods of the present invention can be implemented with a variety of classical garbage collection routines, including compacting mark and sweep schemes and especially on stop and copy schemes.

Much of the design and discussion which follows is based upon analysis of real programs running on a commercially available Common Lisp system. All programs have been run on a Hewlett-Packard Series 9000/350 computer under HP Common Lisp. The HP 350 is a single user workstation based on a 25 MHz Motorola 68020 processor and 68881 floating point co-processor. Its virtual memory system uses 4096 bytes per page. The workstation executes native instructions at an approximate rate of 4 MIPS. HP Common Lisp is a full implementation of Common Lisp as described in G. Steel. supra. The implementation is written primarily in Lisp which has references encoded in four bytes.

The programs analyzed were chosen to be representative of some typical uses of Lisp. These programs are not fabricated benchmarks, nor are they hand optimized for the purpose of benchmarking. All the normally present "missed opportunities" for optimization that appear in medium sized systems exist in this code. There is even evidence that a function or two in some of the tests is running interpreted rather than compiled.

Execution of these tests represents well over one billion instructions. The tests were chosen from programs which are either in daily usage or wide distribution. The programs, along with the input used, are:

Compile—a Common Lisp compiler compiling itself;
NL—a natural language system computing unambiguous parses of 44 sentences of varying complexity;
Reduce—a symbolic math package executing a standard test file; and
RSIM—a transistor level circuit simulator simulating a ten bit counter counting to ten.

Three forms of tools were used in the analysis. All data pertaining to dynamic writes were gathered using a meta-circular 68020 emulator running in the Common Lisp system. This emulator is heavily instrumented and quite knowledgeable about the Lisp implementation. It allows measurement of both the application and Lisp system while not gathering information about either the garbage collector or underlying operating system. All garbage collector specific data were obtained through instrumentation of the existing mark and sweep collector and a new stop and copy collector. Allocation, timing and static data were gathered using specially designed tools.

As with previous optimization schemes, the method of this invention focusses on performance improvement through the reduction of collectable heap and base set size. The reduction of heap size improves the performance of the collector and allows the effort to be focused in high return areas, but is most important in that it allows substantial reduction of base set size. Time will not be wasted searching through old, relatively stable data.

The primary differences between the present invention and prior optimization schemes are in the way the entry vectors or remembered set are maintained, and in the identification of generations. This invention is premised on the idea that in virtual memory systems a less specific form of the entry vector information used in generation scavenging and ephemeral collection is already being maintained for other purposes.

Previous attempts to make garbage collection cooperate with virtual memory systems have involved the collectors giving hints to the virtual memory system, either to change the page replacement algorithm (J. Foderaro and R. Fateman or O. Babaoglu and W. Joy, supra), or to "lock down" areas of memory (Ungar, supra). This invention is based on getting hints from the virtual memory system about the location of references and the current working set.

In paged virtual memory systems, physical memory acts as a cache for pages on disk representing the entire address space of the process. There is usually hardware associated with the physical memory page frames to maintain status information about each page, and to help the translation from virtual to physical addresses. Among the status information normally kept is a bit set by the system hardware which indicates that a given page has been written. This bit, known as the "dirty bit", is used to let the system software know whether or not the memory resident page is in sync with the corresponding disk resident page. If it is necessary to remove the page from memory to make room for another (a process known as "paging"), the dirty bit is checked. When it is not set there has been no change to the page; the disk copy is identical and there is no need to write the contents of the page to disk. The page frame may simply be overwritten by the new page from disk. If the dirty bit is set, then the page frame contains changes which must be written to disk before the page frame can be overwritten. As the new page is brought into the memory, the associated dirty bit is reset to indicate that this page is in sync with its counterpart on disk.

The present invention makes use of these dirty bits to maintain the entry vector. Application of the method will be developed through a series of examples after first describing the unusual requirements this method places on the language and virtual memory systems.

In order for the method of this invention to work, the underlying virtual memory system must support two requests. One is a request to clear all dirty bits for the pages in the process initiating the request. This could be accomplished by forcing all dirty pages to be written to disk, although this would be a very expensive operation. A more practical solution for clearing dirty bits will be discussed later. The second request is to return a map indicating which pages in the process have been written (or written and paged out) since the last clear request.

The map could be encoded in many ways, but for the present purposes the map is assumed to be encoded as a vector of bits with each bit representing a page in the process (or some portion of the process). For many systems, this map is not as large as it might first seem. For a 32 Mbyte process on the machine on which experimentation was done, which has 4096 bytes per page, the entire map fits into fewer than 1024 bytes.

To accommodate the present method, the language system also requires some modification. Clearly, the garbage collector must change, with the exception of tagged systems. Unfortunately, few stock systems are fully tagged where every word in memory contains information about how to interpret its content. Most systems implemented on conventional hardware tag most data objects but fail to tag areas such as blocks of code which would normally be accessed as data by the program.

For most systems (which are not fully tagged), two modifications can be made aimed at providing enough context to make it possible to scan a single arbitrary page in the process for references into the region being collected. First, the garbage collector must be able to identify the parts of the page map that can contain only valid base set elements. This implies that code and data must be separated by page, or that untagged code and data must be encapsulated to make their bounds easy to determine. Second, it must be possible to linearly scan arbitrary pages in the base set, so data (and code) must be aligned on page boundaries. This makes it possible to determine whether or not something that appears to be a reference actually is a reference and not just some random pattern that looks like a reference. Patterns used in representing things such as the internal format for a floating point number are often, but not intentionally, ambiguous.

One way to get the necessary context yet provide the flexibility to represent large structures is to use the following allocation approach: If a structure can be allocated totally on the current page, do it. If it will overflow the page, set the remainder of the current page to a known value and start the structure on the next page. If the structure overflows the page even though it starts at the beginning of the page, note that the second and possibly following pages should be searched starting at the first page on which it is allocated.

Depending on the algorithm used to search pages during collection, it may be possible to loosen the page alignment constraint if the structure which crosses pages is known to contain only references. The exception table used to identify multi-page objects might be nothing more than a bit table similar to that returned by the virtual memory system containing ones for pages that are continued from the previous page.

With reference to FIG. 3, a generalized block-diagram of the method of the present invention includes a step 10 of clearing the dirty page information, and a step 12 wherein user computation stores new values to memory causing dirty bits to be set. Next, the dirty page map is read in a step 14, and the dirty page map is used to identify those base set pages which were written in a step 16. Step 18 then clears the dirty page information, and garbage collection proceeds on the basis of the written base set pages in step 20. Finally, the program flow is returned to step 12.

The following discussions describe specific examples which implement the method of the present invention. However, as will become apparent to those skilled in the art, the present method is generally applicable to a variety of garbage collection routines running on virtual memory systems.

EXAMPLE 1

A first specific example will be that of a stop and copy garbage collector of the type which traverses the entire base set to identify live data objects in a heap. It is not always the case that every reference in the base set identifies some data object in the heap; a reference might point to some other piece of data in the base set or, as is common in the representation of small integers, might actually contain the data. Any effort spent looking through self-contained data in the base set or references from the base set to other parts of the base set is nonproductive and may cause pages to be retrieved from disk that are never referenced except during garbage collections. This first example shows how the use of virtual memory information can help the garbage collector reduce the base set to an approximation of the minimal base set and become less disruptive by reducing unnecessary paging in the process.

With a conventional stop and copy collector, when a collection begins FromSpace is full of data and garbage, and ToSpace is empty. As the base set is traversed and references into FromSpace are found, the data is moved from FromSpace to ToSpace and a forwarding pointer is left in FromSpace to indicate the new location of the data. The reference in the base set is updated to reflect this new location. If a forwarding pointer is found where the data should have been in FromSpace, the new location of the data is known and the reference can be updated. When the base set has been entirely traversed, all references from the base set into FromSpace have been updated to references into ToSpace.

ToSpace is then linearly searched from the beginning looking for additional references to FromSpace. Any references to FromSpace are treated the same way that references found in the base set would be treated. Because the data moved from FromSpace is always moved to the next free part of ToSpace, the area to be linearly searched grows as the search progresses. When the end of copied data in ToSpace is reached, the garbage collection is complete. FromSpace contains only trash and ToSpace contains only live data and unallocated space.

Imagine what happens if the dirty bits are cleared just before the collection starts. As the collection begins, there are no references into ToSpace because there are no data objects there. When the collection ends the pages written will include all pages in ToSpace which contain live data, all pages in FromSpace which contain forwarding pointers, and all pages in the base set containing references which have been updated. It is the pages in the base set that are important; the other pages in ToSpace and FromSpace may be ignored. The pages marked in the base set are only those pages that contain references updated to point into ToSpace. This is the smallest set of pages containing references which have been updated. It is the pages in the base set that are important; the other pages in ToSpace and FromSpace may be ignored. The pages marked in the base set are only those pages that contain references updated to point into ToSpace. This is the smallest set of pages containing the minimal base set for the newly collected heap. If another garbage collection were requested at this instant, only the pages in this set would need to be scanned to find all references into the heap. Another collection at this time would be unnecessary, but as the user computation is continued, and additional pages in the base set which are written represent the only other pages which could possibly contain references into the collectable heap.

When the next garbage collection occurs, it is not necessary to traverse the entire base set to find references into the collectable heap. It is only necessary to scan the pages written during and since the last collection. If a page in the base set contains no heap references and is not written during the computation, there is no need to scan it during the collection.

Although the benefits of this first example are not necessarily dramatic, it is intended primarily as a way of demonstrating the basic function of the method. By maintaining information about where references into the collectable heap could have been stored, it is possible to approximate the minimal base set.

All of the following examples employ the same approach; just before the first reference from the base set to data in the collectable heap is updated, clear the dirty bits. In this way, if the only subsequent modifications to the base set are to update heap reference, then the pages in the base set written at the finish of the garbage collection will be those containing the minimal base set for the collected heap.

Adding the virtual memory information to the operation of the collector did not require any substantial garbage collector changes other than that necessary to scan the reduced base set. In fact, the first map of dirty pages was generated via a normal traversal of the full base set. The following examples will show ways in which the base set and collectable heap can be reduced to focus on the areas with the highest mortality rate.

Superficially, this reduction in base set may not sound very useful. To get some indication of how useful this might actually be, the four test programs were analyzed to learn about their base sets and minimal base sets. The results of the measurements follow in Table 1.

TABLE 1

| STATIC BASE SET MEASUREMENTS | | | | | | |
|---|---|---|---|---|---|---|
| | | Without Packages | | | With Packages | |
| Program | Total Base Set (Pages) | Minimal Base Set (Pages) | % | Refs to Heap | Minimal Base Set (Pages) | % |
| Compile | 220 | 86 | 39 | 5403 | 200 | 91 | 16483 |
| NL | 276 | 120 | 43 | 7447 | 254 | 92 | 20549 |
| Reduce | 278 | 95 | 34 | 6287 | 247 | 89 | 20469 |
| RSIM | 239 | 93 | 39 | 5625 | 210 | 88 | 17165 |

As can be seen in the above table, the results are broken into two categories. The partition labeled "With Packages" is a naive measure. These numbers were generated by simply searching all base set pages for references into the heap. Each page containing a reference to the heap is considered part of the minimal base set. A total of all references found is reported in the "Refs to Heap" column. Unfortunately, references were spread around enough that about 90% of the pages in the full base set contained at least one reference into the heap, and thus would have to be scanned to find all references into the heap. A collection would require a search through approximately one megabyte of base set. This does not bode well for the method just presented.

A closer inspection of the nature of the heap references showed that, because of the way in which the system encodes symbols, well over half of the references were to package structures. These are references which identify the home package for a symbol. Since there are approximately twenty different package structures contained in the system and packages are, by nature, fairly static, most can easily have their small top level structure absorbed into the base set. This quirk due to encoding was factored out and the modified results are presented in the "Without Packages" portion of the table. The number of heap references from the base set can thus be reduced dramatically, and the number of pages containing heap references can be reduced to about 40% of the total. This reduction implies that around 60% of the pages in the base set must be searched only if they have been written during the user computation. Potentially, this reduction could have a very significant impact on collector performance.

EXAMPLE 2

A second example assumes a system that uses a compacting mark and sweep collector which has just finished a collection. All live heap data have been compressed into the bottom of the heap. The heap remaining above the live data will be used for future allocation. The currently unallocated area will be referred to as the "new heap".

This example will use the most simplistic method of reducing the collectable heap size. The collectable region of the heap for the next collection will consist only of the new heap. All objects which have survived the just concluded collection will be declared stable, i.e. they will be considered part of the base set.

The heap size for the next collection has been reduced to include only the highest mortality area. Now consider what can be done to reduce the base set for the next collection. Optimally, the minimal base set will consist only of those locations in which references into the new heap will exist when the next collection begins.

At this point it is known that there are no references into the new heap because there are no objects allocated there yet. If the dirty bits are now cleared, when the user computation continues, each write that takes place will cause a dirty bit to be set. When the user computation is suspended for garbage collection, the set of pages written will include all the pages in which references into the new heap were stored. Also included in the pages written will be all pages in the new heap (allocated storage must be initialized) and any other page which may have been affected as a result of the computation. What is not included is the set of pages in the base set that have not been written during the user computation.

The garbage collection can now occur in a normal manner with a minor exception. Instead of traversing the entire base set, the map from the virtual memory system is requested and only the pages which are contained in the base set and have been written are used. They are linearly scanned looking for references into the reduced heap and later scanned again during the pointer update phase of the collection. When the collection is complete, the dirty bits are cleared and the user computation is continued.

As before, the actual technique for garbage collection is substantially the same as in the prior art; all the same phases normally present in a standard compacting mark and sweep collector take place. However, a major difference of this invention over prior art collectors is in the manner of traversing the base set.

The present method capitalizes on the idea the at the minimal base set for reducing the heap is substantially smaller than the minimal base set for the previous, larger heap. Identifying only the minimal base set is quite difficult. Neither generation scavenging nor the ephemeral collector can guarantee that only the minimal base set will be identified since multiple side effects of the same location may result in unnecessary entries in the tables. It certainly is the case that the remembered set used in generation scavenging is a much closer approximation of the minimal base set that the set of pages obtained using the present method.

This second example demonstrates an easy application of the present method to reduce effort in a compacting mark and sweep system. A disadvantage of this second example is that it requires an object to survive only a single collection before it becomes stable (i.e. part of the base set). Surviving a single collection is probably not a sufficient criteria for making a piece of data permanent in most systems. The stable heap might quickly fill with rapidly dying data. Resolving this problem will be discussed in following examples.

It is interesting to note that even though data that has survived a collection is considered to be part of the base set, it is still possible to do collections on the data. By completely traversing that part of the base set which excludes the stable heaps and, once again considering the stable part of the heap dynamic, a full compacting mark and sweep collection can be performed.

Separating the stable heap from the base set should be quite easy. Fully traversing the base set was the normal operation of the collector prior to the initial clearing of the dirty bits. In fact, at the end of this full collection the system is in exactly the state described at the beginning of the example.

The performance of this method depends upon the realized reduction in the base set and the comparison with methods that record individual references rather than the page containing the reference. The issue is whether there is sufficient overhead involved in scanning the excess data on a page to make the proposed method ineffective. The programs mentioned early were re-examined to determine how many pages would need to be scanned if only pages modified by the user computation were searched. Table 2 shows the results for the number of pages modified during the complete computation with no intervening collections.

TABLE 2

| DYNAMIC BASE SET MEASUREMENTS | | | |
|---|---|---|---|
| Program | Total Base Set (Pages) | Written During Execution (Pages) | % |
| Compile | 220 | 41 | 19 |
| NL | 276 | 16 | 6 |
| Reduce | 278 | 37 | 13 |
| RSIM | 239 | 17 | 7 |

The percentage of the total original base set pages that were modified is quite low (6–19%). There is a reasonable probability that the reduced base set could be held in physical memory. In fact, there is some chance that all the pages in the reduced base set would be present in memory when collection was required.

Even in the unlikely event that all base set pages need to be paged in, it should be possible to entirely traverse the reduced base set in no more than one-fifth the full base set traversal time.

An additional test was run to learn about the speed at which pages could be linearly scanned. If page scanning is too costly, it would seen that the only reasonable approach would be adoption of an entry vector system using inline code similar to that suggested by generation scavenging. There are no clear criteria for deciding the point at which one method becomes more attractive than the other. Many factors must be considered. Certainly as pages get smaller, the scanning algorithm begins to look better since, in the limit of page size matching reference size, they are approximately equivalent. This does not take into account the overhead of maintaining or searching the entry vector, the density of references into the heap contained on the pages written, or paging involved in making the page to be scanned available.

In the case of the machine used for experimentation, 1024 references can be contained on a single page, so clearly a single reference can be scanned in about 0.1% of the time for an entire page scan. As more references into the heap are contained on a single page, the overhead in scanning the page goes down. The question becomes whether or not on an absolute scale the differential between entry vector access and scanning is important.

Table 3 shows the times necessary to linearly scan three classes of memory resident pages: a page filled with references into the collectable heap, a page filled with references to data objects not in the collectable heap, and a page filled with non-references. Times given include calculating an address, fetching an item from the page, extracting the tag, dispatching on the tag, and performing a range check on references.

TABLE 3

| PAGE SCANNING TIME (HP9000/350) | |
|---|---|
| Type of Items | Time to Scan 1K Items (milliseconds) |
| References into heap | 2.54 |
| References outside heap | 2.30 |
| Non-references | 1.89 |

There is no clear conclusion to be drawn from Table 3. The absolute times are not excessive (30-104 milliseconds to scan all pages touched), but probably much worse than looking through an entry vector containing only actual references into the heap. Nonetheless, there is no consideration of other time expenses such as maintenance of the entry vector. It is not even obvious that this time will not be dwarfed by the time necessary to copy data from one space to the other. It is obvious that scanning a page takes substantially less time than that required to retrieve a page from disk. On the system used, a page fault takes between 20 and 30 milliseconds to handle and scanning takes about 2.5 milliseconds.

Regardless of comparison to other systems, the ability to avoid page faults will significantly decrease the time spent in garbage collection. This is one of the key goals in reducing both heap and base set size.

Maintenance of the entry vector is an overhead cost which must also be considered in deciding what method to use. In the present example, there is essentially no time spent maintaining the entry vector. The entry vector is primarily maintained in virtual memory hardware with a small amount of time being spent in maintenance during paging operations. There is some time required to retrieve the entry vectors from the virtual memory system when a garbage collection is to occur.

Using the inline coded version of generation scavenging, unnecessary page scanning is avoided by keeping much more detailed information in the entry vector. When a store operation to a location other than the stack or registers occurs, a test must be made to see if the generation tag of the destination object indicates an older object than the generation tag of the value being stored. If a young object is being stored in an older object it is necessary to add the destination object to the entry vector if the value being stored is a reference into the collectable heap and the destination object is not already in the entry vector.

On the experimental machine, the inline code to extract the two generation tags, make the comparison, and conditionally jump to a location where a more detailed routine could decide if a new object should be added to the entry vector, requires a minimum of five instructions. This assumes registers are available to hold the generation tag values. Adding the necessary five instruction to each appropriate write will case from 7.6% to 15.2% more instructions to be executed in the test programs (not including any instructions executed if the entry vector may need modification). These results were generated from information contained in Table 4, below. Clearly, this is not an insignificant cost.

EXAMPLE 3

As a third example, a possibility which has not been previously mentioned, but which may be useful in systems which do not support virtual memory or which do not provide dirty page information, is the use of inline code to keep track of the pages written. This also provides a basis for making a cost comparison of a detailed entry vector and a dirty page map.

If the inline code merely records the pages written in a vector of bits similar to that returned by the virtual memory system, then the benefits of the new method can be realized without any virtual memory modification. The cost is that of the inline maintenance of the dirty page map. This cost may be traded off against any time spent in the virtual memory system maintaining or returning the dirty page map. The inline code is only required to extract the page number that is the destination of the store and set the appropriate bit in the map to reflect the write.

On the experimental machine, two instructions would be required a each write to record the information. This represents a 3.0% to 6.1% increase in the number of instructions executed and assumes that the map is a at a fixed location and a register is available for the page number.

If the very simplistic assumption is made that all instructions execute in the same amount of time, a reasonable comparison of the cost of entry vector maintenance versus page scan time can be made. The test program Reduce represents the worst case situation for the new method (i.e. minimum write ration with one of the largest percentages of pages written), so it will be used in the comparison. On a 4 MIP machine with no paging or garbage collection, Reduce should execute in approximately 18.8 seconds. If individual locations are stored in the entry vector, the overhead would be approximately 1.429 seconds, just for generation tests. If only dirty pages are recorded, the overhead would be about 0.564 seconds. The difference is 0.865 seconds which would be the equivalent of scanning 346 pages. Since Reduce only writes 37 pages during its entire run, the time difference corresponds to scanning all these pages more than nine times.

Thus, using this analysis, the inline dirty page map approach is faster than the inline version of generation scavenging until garbage collections are necessary at interval of less than two seconds. There is substantial reason to believe that the use of the virtual memory system to maintain the dirty page map will result in even less overhead, and therefore better performance.

EXAMPLE 4

A fourth example uses stop and copy collection with stable data. The stop and copy example given earlier only reduces the base set by eliminating some self-contained structure. This example will show how the stop and copy method can be modified in much the same way as the compacting mark and sweep to reduce the space being collected and, therefore, further reduce the base set.

Figure 4C:
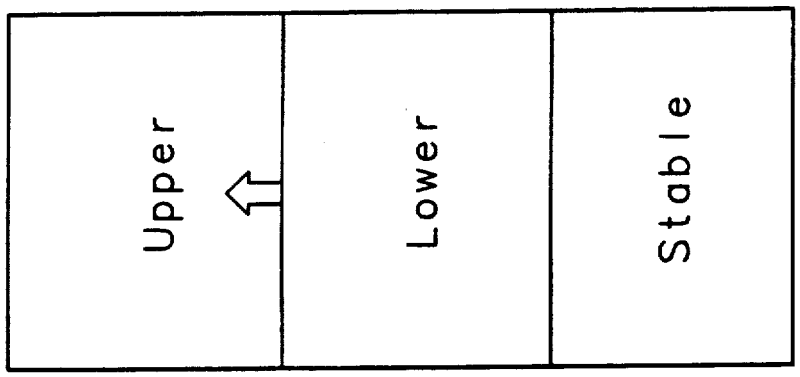
FIG. 4(a-c) illustrates a heap layout for quick stabilization used in a first embodiment of the present invention.
Figure 4B:
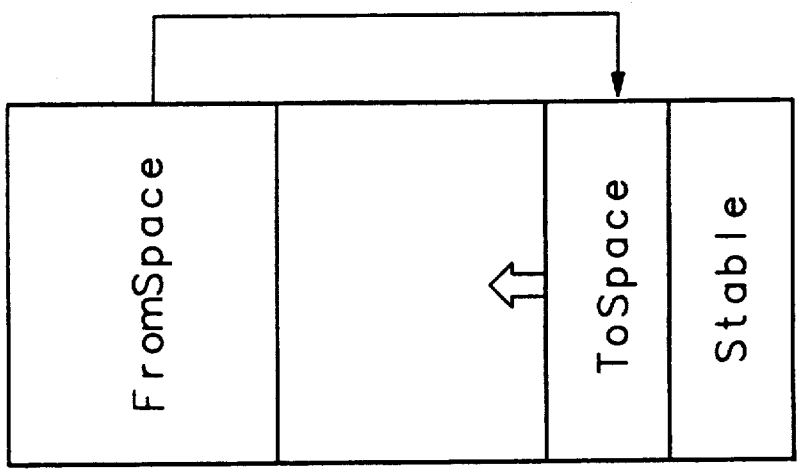
Figure 4A:
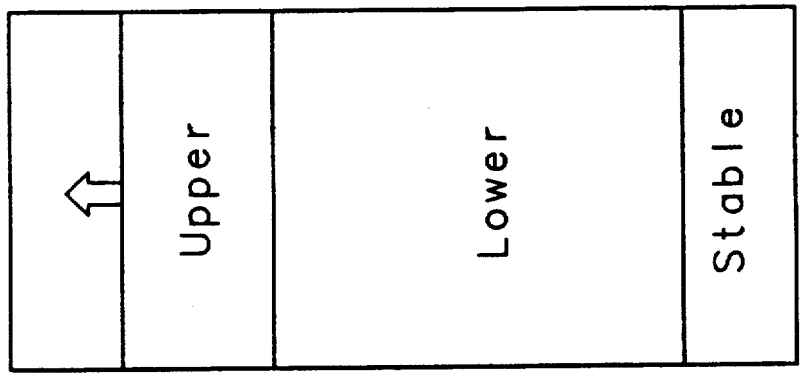

With reference to FIG. 4, consider a heap divided into two equal spaces. The dirty bits are cleared, and new data objects are allocated starting from the lower end of the upper space (i.e. starting from the middle of the heap) and continuing toward the upper end of the space (FIG. 4a). The user computation continues until the upper space is filled with newly allocated data objects. The user computation is suspended for garbage collection.

The dirty map is then requested, but not cleared. A normal stop and copy collection proceeds using bits in the dirty bit map to determine which pages to scan. The upper space is treated as FromSpace, and the lower space is treated as ToSpace (FIG. 4b). Surviving data is copied to the lower end of ToSpace and scanned for other references into FromSpace.

When the collection is completed, all live data from the upper space has been copied to the bottom of the lower space. This is the data which has survived a collection and will be considered stable. It no longer needs to be considered part of the heap. Removing data from the heap obviates the need to have storage in both spaces to allow the data to be copied back and forth. In essence, this means that stable data has half the storage requirement of dynamic data.

Because this new, stable data is sitting at the bottom of a contiguous heap, it is possible to remove it from the heap by defining a new bottom for the heap which sits just above the data being removed (FIG. 4c). The newly defined heap is divided into equal spaces and, after the dirty bits have been cleared, the user computation may be continued once again using the upper space for allocation. Even though this layout differs dramatically from the semispaces of H. Baker. supra, used in most stop and copy garbage collectors, the fundamental operations involved in setting up the spaces, allocating and copying data are identical.

There are several benefits of this approach over a conventional stop and copy collector. First, the collectable heap has been reduced to only the upper half of the dynamic heap and the newly allocated, high mortality objects contained in it. The base set can be reduced to reflect this reduction in collectable heap. This should result in faster collections focused in high return areas.

Second, paging performance should be improved since the new allocation is always being done in the upper half of the heap. The top of the lower space in the heap should never be touched during normal operation since data is only copies to the bottom of the lower space. The pages corresponding to the top of the lower space should be able to remain on disk only to be brought in during full collections or in the unlikely event that almost the entire collectable heap survived a collection.

Third, conventional stop and copy collectors can only utilize half of the available data memory since any collection may require copying all of the data in FromSpace to ToSpace. This method allows up to two thirds of the space to be utilized while still permitting an almost complete conventional stop and copy collection of the entire stable and dynamic data memory.

Full collection is slow but possible. It should be triggered when, just after a reduced collection, the stable area exceeds on third of the available data space. Note that just before the reduced collection approximately two thirds of the data space was in use. If the stable heap does not exceed half of the available data space, then dividing the available data space into two halves and performing a full, conventional stop and copy collect after clearing the dirty bits will reduce the stable area but leave it in the upper half of the data space. A second, reduced base set collection either before or after allocating the remainder of the upper half of data space will minimize the stable data size and return it to the proper place. After clearing the dirty bits and reestablishing the upper and lower spaces, partial collections can continue if stable space was reduced to less than a third of available space or if it is acceptable to lose the ability to collect stable data space using a stop and copy collector.

If, when the full collection was indicated, the stable heap was over one half of the available space, a more complex sequence must occur. A full stop and copy collection must be done to move the newly stable data from lower space back to the upper space. The old stable space must be treated as part of the base set. Then one full and one reduced base set collection must be done to move the stable area into lower space and back while considering upper space part of the base set.

A final, full collection of upper space to lower space with stable space in the base set competes the process. The only structures which cannot be collected using this method are circular structures which cross the boundary between stable space and dynamic space. Of course, it is always possible to use a compacting mark and sweep collector to regain all possible space, but this means that two different types of collectors must be supported.

EXAMPLE 5

As a fifth example, aging will be added to the present method. It has been stated that new data has a much higher mortality rate than old data. The obvious problem is defining the age of an object. The previous two examples provided a very simple way of establishing age: young data is that which has not survived a collection, old data has. This may be acceptable, but certainly requires some form of evidence that it is sufficient for a practical system.

There are several techniques for determining the age of an object. The use of wall clock time does not seem appropriate since the lifetime of an object on a slow processor would be longer than the lifetime of the same object on a faster processor. The age needs to be tied in some way to the computation.

There are many possible metrics which could be used. The one which will be used here is one of the simplest to implement that still maintains some intuitive meaning. This metric bases the age of an object on the amount of storage allocated. Each time a fixed amount of storage is allocated, a new generation is created. If it is believed that a computation has a roughly constant allocation rate, the age can be converted into wall clock time scaled for the speed of the processor.

It can be argued that the aging of data (i.e. frequency of reclamation) should be based on wall clock time since virtual memory algorithms often include time in page freeing policies. The justification for excluding time directly is that it seems inappropriate to expend any effort reclaiming garbage if there is no demand on the memory resource. As long as new data objects are not being allocated, the primary benefit of periodic reclamations is to increase the density of the working set. It is felt that if the area of new allocation is sufficiently small, the impact of these periodic reclamations on the size of the working set should not be very significant.

Experiments were run to both test mortality rates and learn more about how to deal with aging data objects. The system used for the experiments contains a hand-coded compacting mark and sweep collector. This particular collector has the very useful property that the compaction phase maintains the creation order of the data objects. That is, a given data object in the heap is younger than those lower in the heap and older than those higher in the heap. Consequently, markers placed in the heap can be used to gather statistics about the mortality rate in various generations.

The collector was modified to keep track of the size of each generation in the heap both before and after a collection. Statistics were maintained for the nine youngest generations and for a single group including all older data objects.

As described above, to give some intuitive meaning to the concept of a generation, after each collection the region for new allocation was always initialized to a constant size. The size of the area to be allocated was increased by factors of two from 16 kilobytes to 1 megabyte for different runs. A constant allocation area implied that collections would occur at roughly equal time intervals if the rate of new allocation could be approximated as a constant. Were this not done, the collections would occur at times which depend on the number of data objects in previous generations; when many data objects existed, the collections would become more frequent and objects would age more quickly.

The test programs were analyzed with respect to their allocation characteristics. The amount of storage allocated and the number of garbage collections required to run each test is given in Table 4.

TABLE 4

| STORAGE ALLOCATED DURING EXECUTION | | |
|---|---|---|
| Program | Total Storage Allocated (megabytes) | Generations During Run (32 KB/Gen) |
| Compile | 13.6 | 435 |
| NL | 12.4 | 398 |
| Reduce | 2.0 | 64 |
| RSIM | 2.6 | 84 |

Figure 5:
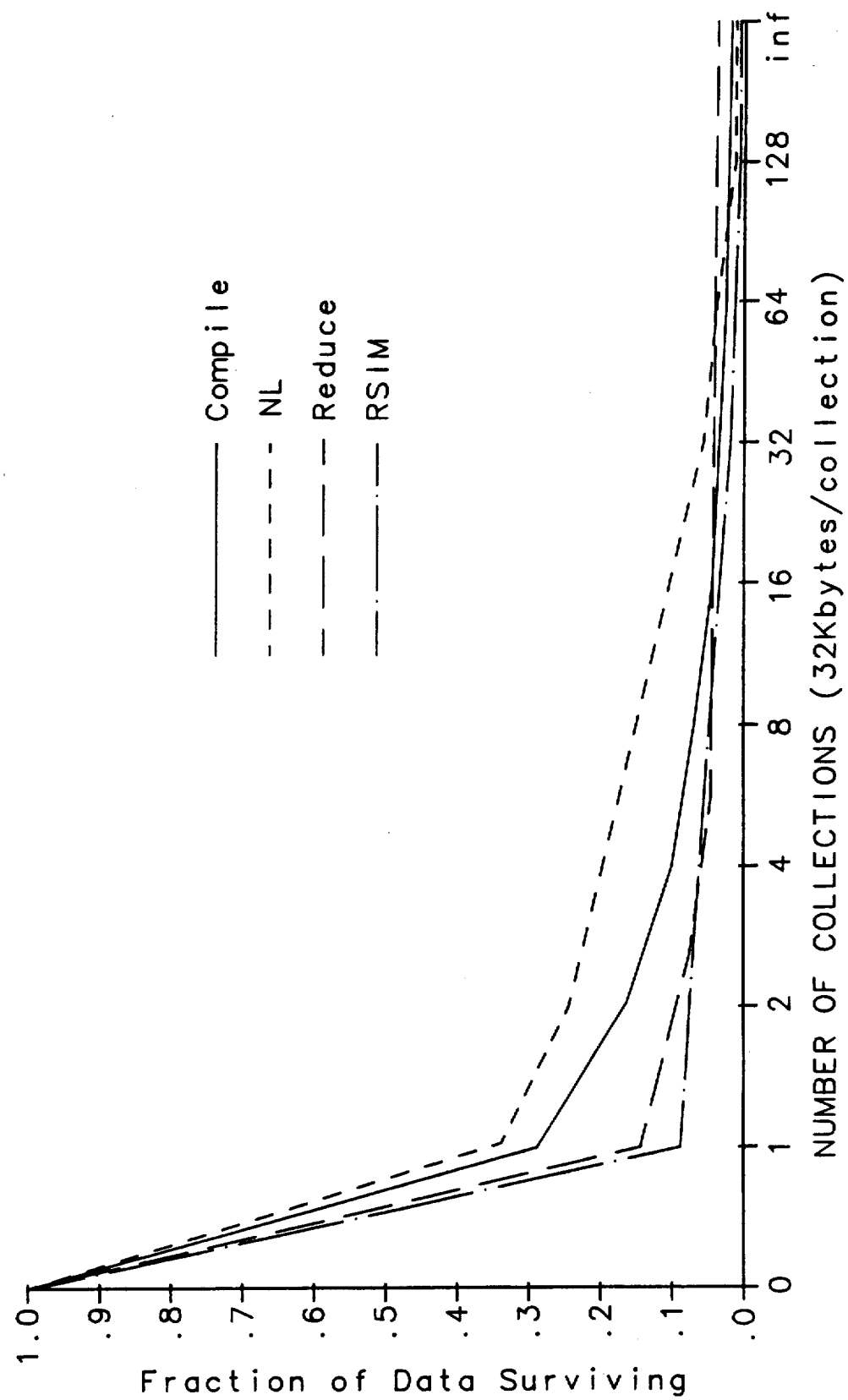
FIG. 5 is a graph illustrating data object survival rate when using the garbage collection routine of FIG. 1(a-d) with four different programs.

A plot of the fraction of the originally allocated area which survives to a given generation is shown in FIG. 5. For the purpose of this figure (and Table 4), a generation is said to pass when 32 kilobytes of the heap have been allocated. This corresponds to 8192 references being allocated during a single generation.

A survey of the literature fails to disclose any other quantitative studying of data object lifetimes in Lisp. D. Ungar, supra, has done a study of the lifetimes of objects in Smalltalk which involved a single test program that only required there collections before termination of a single iteration. Nonetheless, the Smalltalk data is similar in appearance to that reported here.

There are significant results contained in FIG. 5. First, even though the various programs are different (yet reasonably representative of some normal types of Lisp loads) they all substantiate the premise that the mortality rate of young objects tends to be significantly higher than that of older objects. Even the lowest first generation mortality rate is over 69% with only 32 kilobytes being allocated per generation. With larger allocation areas the rate rises quickly into the 80–98% range. The mortality rate does not always montonically decrease as the generation number increases, but a weak tendency in that direction is apparent. In every case the mortality rate of the youngest generation far exceeds that of any other generation.

Second, since the members of older generations are just the survivors or younger generations, it is also true that, in absolute terms, the storage reclaimed from the youngest generation is greater than the storage reclaimed from any other single generation. In fact, the raw data from which the plot was created indicate that, on the average, the storage recovered from the youngest generation exceeds that recovered from all eight other generations.

Third, the lifetimes of data objects in the different programs are not the same. Certainly they exhibit strong similarities but, for instance, RSIM data is doing a large amount of floating point computation while NL does none. On the system being used, floating point computations always produce new allocations of a floating point object to hold the result. Since floating point data objects used for intermediate results in calculations have relatively short lifetimes and are created in substantial numbers by RSIM, the mortality rate is increased for small allocation areas. The increased use of global data structure in RSIM accounts for discrepancy in the percentage of data objects that survived the entire run.

The idea of making data stable after it survives a single collection makes sense for sufficiently large allocation areas, because the mortality rate will likely be well over 90% and the frequency of collections will be low. Unfortunately, for smaller allocation areas the mortality rate among data that has survived a single collection may not be low enough to prevent the heap from filling with uncollectible data that has survived a single collection. D. Ungar, supra, has referred to the problem of stabilizing data too quickly as "premature tenuring".

There is a tradeoff involved in choosing the size of allocation area. If the area is too small, collections will be frequent and not very effective. If the area is too large, collections will not be as frequent and will be much more effective, but may result in long delays due to sheer size and unwanted paging due to the inability to fit the entire area into physical memory. For a system which makes data stable after only surviving a single collection, it would be best to err on the side of making the allocation area too large, but an optimum size would still allow the area to reside in memory.

There are benefits to using small allocation areas in determining generations. Garbage collections take less time and the entire heap stands a better chance of remaining in physical memory. There are also benefits to using larger allocation areas. Fewer short lived data objects will become stable so fewer full scale collections will be needed. By requiring multiple generations to be survived before stabilization, the benefits of both sizes of allocation areas can be realized. The next example will explore ways in which data objects can be made to survive an arbitrary number of generations before moving out of the collectable heap.

EXAMPLE 6

This sixth example will illustrate how the use of virtual memory information can be combined with storage layout to create an efficient collection method that: (1) focuses on high mortality areas to reduce effort; (2) is not excessively disruptive of the working set for a computation; (3) allows for stabilization of data after an approximate age has been reached; and (4) permits better utilization of memory than more The method for using virtual memory information has been demonstrated in each of the preceding examples and is now restated. At a time when the area to be collected during the next collection is vacant, clear the dirty bits. References to the collectable area cannot exist outside the set of pages which will be written as the area is allocated.

The new problems which must be addressed in this example is how to handle an arbitrary number of generations. Generation scavenging includes a field in each reference to indicate the generation of the referenced data object. The use of this field allows generations to be mingled without fear of losing track of age. This approach has some great characteristics but, as mentioned earlier, was not considered viable for use in the existing implementation. The additional tag field would require extensive redesign and would have severe effects on performance.

It is viewed as critical that the method not be overly complex nor put excessive constraints on memory utilization. For instance, the most straightforward way to handle an arbitrary number of generations would be to have one heap for each generation. As a data object ages it would pass from heap to heap.

Figure 6A:
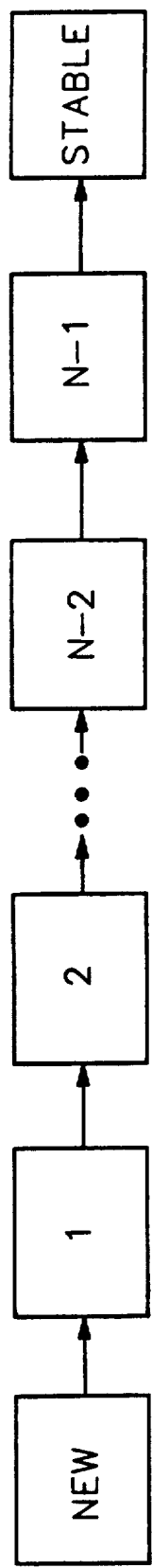
FIG. 6(a-c) illustrates two views of a multi-generational heap of a second embodiment of the present invention.

FIG. 6a illustrates the organization of heaps for a system requiring survival of N garbage collections before a data object could become stable. This approach converts the explicit field used in generation scavenging into positional information; the generation of an object could be determined by its location.

The problem with this approach is that it requires the division of a single contiguous heap into several smaller heaps. Problems concerning how the heap should be subdivided and how to adjust the various sizes dynamically will probably result in poor memory utilization and prevent this from being a viable solution.

H. Lieberman and C. Hewitt, supra, associate an age with each page of data. This method avoids the problem of having independent heaps since heaps for the various generations are segregated only by pages. Nonetheless, this method was not extensively investigated because it superficially appears to require a fair bit of bookkeeping and elaborate memory allocation to make everything work properly.

Figure 6B:
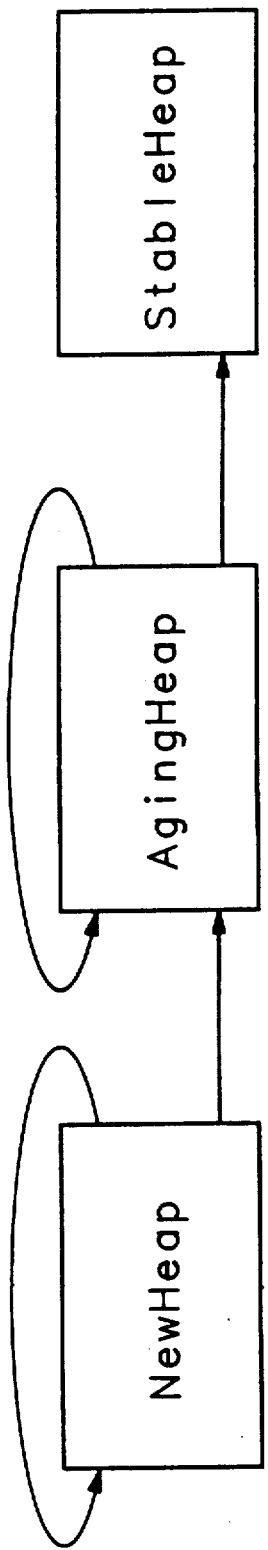

The storage layout chosen is an engineering compromise which trades control over the exact age at which an object becomes stable for high memory utilization with a very simple layout and garbage collector. The layout is based on the use of a stop and copy collector. The easiest way to understand the present method is to view data space as consisting of three independent regions: "StableHeap", "AgingHeap", and "NewHeap". These three regions form a bucket brigade as shown in FIG. 6b.

The operation of this method is quite similar to the operation of the N stage method just described. StableHeap is where data that has survived sufficient collections resides. Data in StableHeap is only subject to garbage collection at the rare occasions when a full collection is signalled. AgingHeap is where the guarantee of age is achieved. When data is moved from NewHeap to AgingHeap all that is known about its age is that the data has survived at least one collection. The data may have survived as many as N-1 collections before advancing to the AgingHeap. The data must then sit in AgingHeap for N-1 collections before being transferred to StableHeap. Because there is no way to differentiate among the various generations that sit in AgingHeap, no new data may be added to AgingHeap until the full N-1 collection aging period is up and/or AgingHeap is emptied. Consequently, new data objects, which may be only generated in NewHeap, must remain there through up to N-1 garbage collections waiting for AgingHeap to be vacated.

When AgingHeap is empty, the contents of NewHeap are then transferred. Any data objects which reach StableHeap are thus guaranteed to have survived at least N collections and possibly as many as 2N-1.

Due to the subdivision of a single contiguous heap into three sections, it would seem that this method has all the same problems as the earlier subdivided heap method. Luckily, this is not the case. In fact, it is possible to lay out the three areas in such a way that all necessary movement between heaps and all dynamic sizing of the heaps is accomplished by trivial pointer manipulation.

Figure 7B:
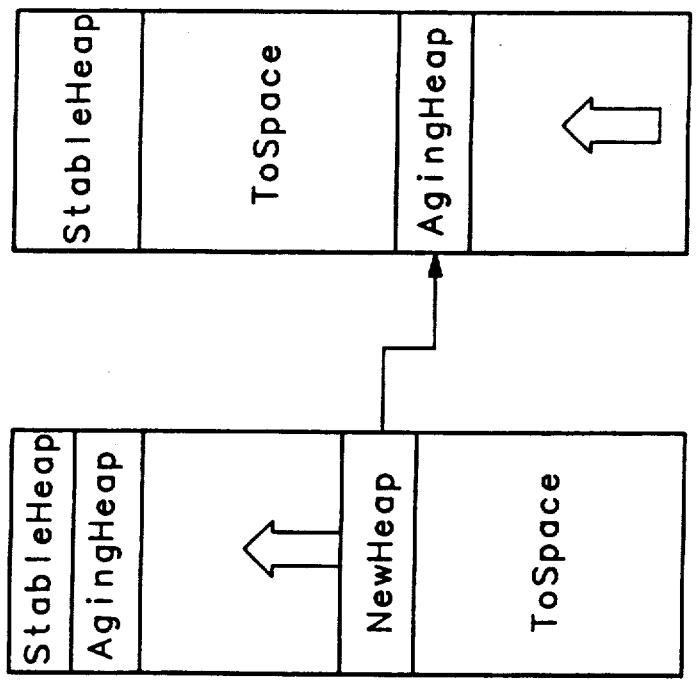
FIG. 7(a-b) illustrates the layout and collection of the multi-generation heaps shown in FIG. 6(a-b).
Figure 7A:
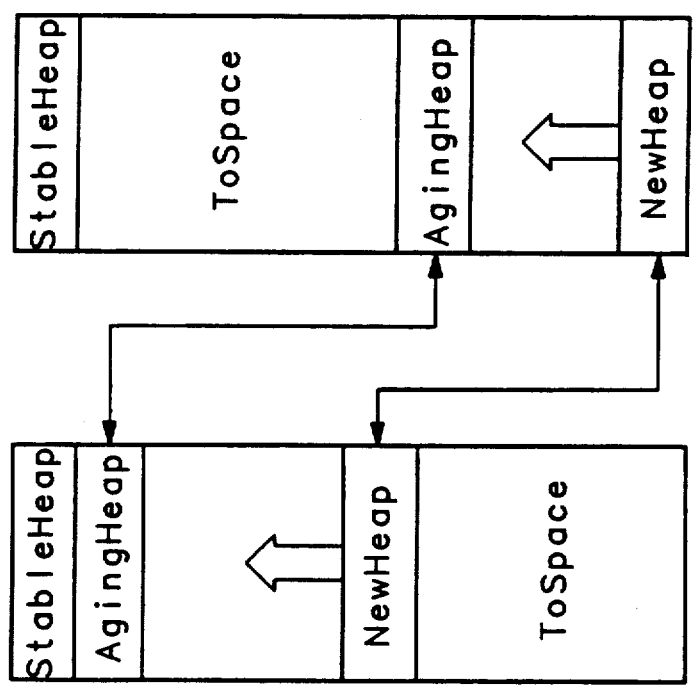

A memory layout is shown in FIG. 7. StableHeap sits at the top of memory and grows downward. Below, but touching StableHeap, is a pair of equally sized spaces used as the two spaces of a stop and copy collector. At any point in time only one of the two spaces is actually in use, so NewHeap and AgingHeap must share one of the spaces FromSpace) yet maintain their independence. This is done by allocating NewHeap from the bottom of the space and allocating AgingHeap (downwardly) from the top. A single pointer identifies the boundary between them.

During a normal garbage collection in which there is no transfer between heaps, the virtual memory page map is requested, the dirty bits are cleared, and a slightly modified stop and copy garbage collection is performed. Data objects to be copied from above the boundary between newHeap and AgingHeap are copied to the top of ToSpace, and illustrated in FIG. 7a. The linear search of the top of ToSpace must also be slightly modified to account for the reverse allocation into the next version of AgingHeap being done.

Transferring AgingHeap contents to StableHeap looks quite similar to a normal non-transfer collection. One constraint is that the transfer must always happen just prior to a collection which will move the data from the space adjacent to StableHeap. When in this configuration, AgingHeap is contiguous with StableHeap, as illustrated in FIG. 6b. The stabilization of the aging data requires nothing more than moving the boundary of StableHeap to include AgingHeap. The boundary between the two lower spaces can (but may not need to) be adjusted so that the spaces are again of equal size.

All that remains is to move the data from NewHeap to AgingHeap. The transfer of NewHeap to AgingHeap can be accomplished by just moving the NewHeap/AgingHeap boundary pointer to indicate that what used to be contained in NewHeap is now contained in AgingHeap. Executing a normal collection will result in everything appearing in the proper place for the next N-1 normal collections to proceed as required.

The same garbage collector can be used for all collections and transfers of data from heap to heap, only the manipulation of three pointers differentiates among the types of collections being done. Because the division of the overall data space into three parts is similar to that used in a previous example, it is possible to follow the same algorithm described for doing a full collection.

If the allocation from the top of NewHeap is felt to cause excessive paging, the same technique used in generation scavenging can be applied to decrease virtual memory allocation. When garbage collection is required, this area would be considered part of NewHeap. The heap above the new allocation area should be broken into thirds, and the boundary between the two semispaces used in the collection should be fixed at the first third mark above the fixed space; the upper two thirds will be the original size of the upper semi-space. If new allocation is done in the fixed area and the NewHeap and AgingHeap are copied back and forth as before, with no adjustment of the bottom semi-space size when stabilization occurs, then the paging characteristics will be quite similar to those of generation scavenging. This refinement would be most useful in systems intending to do very frequent collections (e.g. each few seconds).

The reduction in base set hinges on the ability of the garbage collector to obtain information about the pages in the process which have been written since a particular time in the computation. Establishing the time in the computation from which the record is to be kept is the purpose of the "clear dirty bits" request. Since dirty bits are only set when writes occur, it is not possible to determine if a page has been written since a particular time unless the dirty bit is reset at that time.

Unfortunately, the resetting of dirty bits interferes with their normal use by the virtual memory system. They are normally used to indicate that a page is different from the corresponding page held on disk. If the bits are artificially cleared, there is no record that the page must be written to disk to record the modifications when its time for being paged out arrives. The changes will be lost unless it becomes the policy that all pages are written out when they must vacate physical memory. Neither the loss of changes nor the unnecessary disk traffic resulting from writing out every page is acceptable. Also unacceptable is the technique described earlier for clearing dirty bits: writing all dirty pages in the process to disk. The purpose of the proposed method is to improve, not degrade, garbage collector performance.

Changing the state of the dirty bits indirectly (e.g. by paging the dirty pages) is too expensive because of the time consuming work which must be done, yet only the hardware dirty bits can provide the information needed by the collector. The solution then centers on how to save the state of the bits at a given point in time so that the hardware can be used to record more recent events. The state recorded in the dirty bits is the information necessary for the garbage collection (presuming nothing has been paged out). The combination of the state recorded in the dirty bits and the state saved when the dirty bits were cleared represents the information previously available to the paging software.

Figures 8A, 8B:
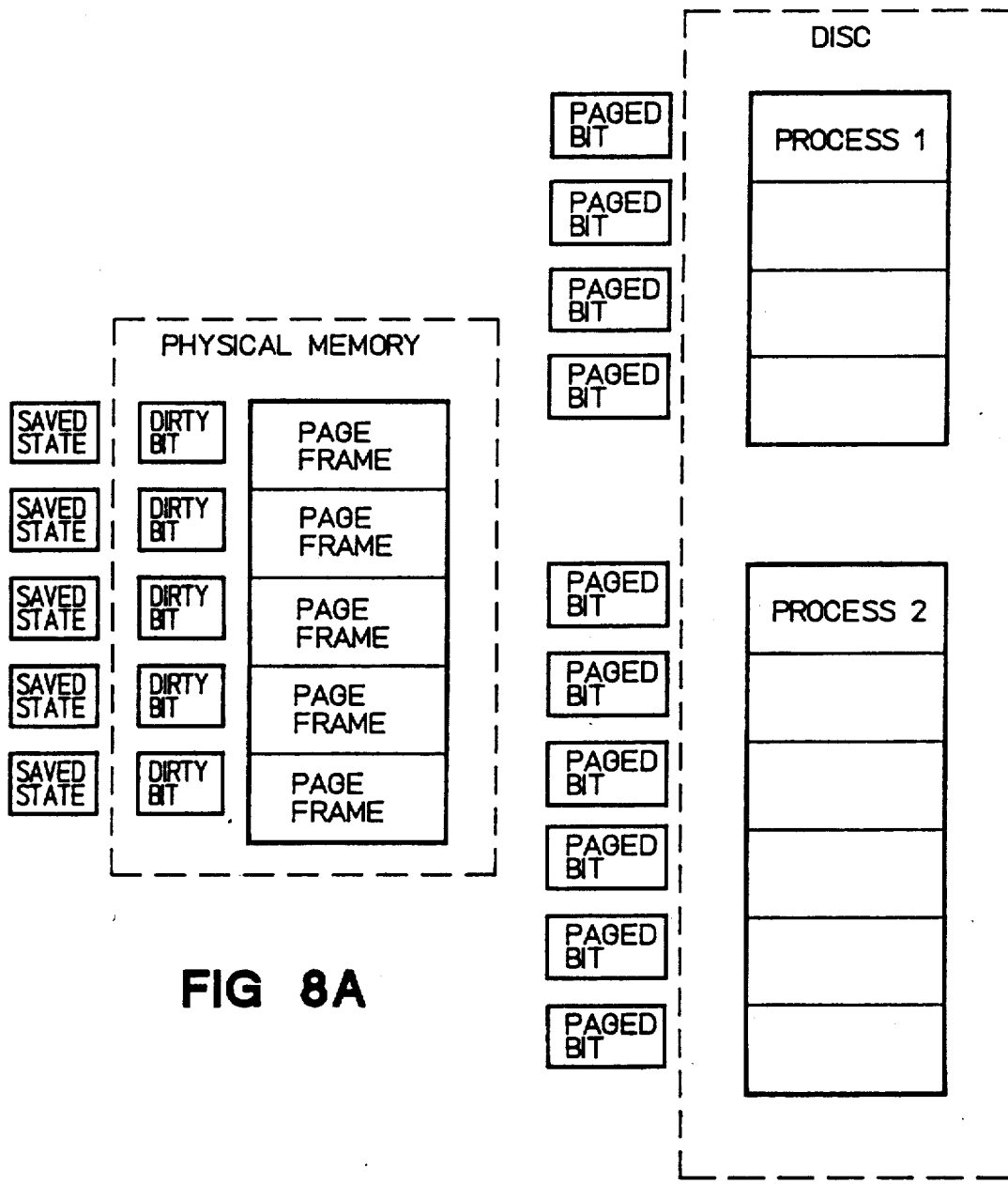
FIG. 8(a-b) illustrates several virtual memory system structures which are interfaced with the garbage collection routine of the present invention.

Since the dirty bit state prior to a clear request is not of any use to the garbage collector, it should be held in the manner that leads to the highest efficiency in the virtual memory system. It can certainly be viewed as a vector of bits in the same orientation as the physical dirty bits are found, ordered in the same way as page table entries. It is not necessary that this state information be duplicated for each process. There is only one set of dirty bits, so there only needs to be one set of bits to represent the saved state. See FIG. 8.

Assuming the existence of clearable dirty bits and a bit vector to represent the saved dirty bit state, the clear request would cause the following sequence to occur. Page frames used by the process making the request must be found, For each page frame found, if the dirty bit is clear, it may be skipped. If the dirty bit is set, the corresponding bit in the saved state table must be set, then the dirty bit must be cleared.

The paging software must also be modified to be cognizant of the separation of dirty bit information into two distinct area. When a page is paged in, both the dirty bit and the save stated of the dirty bit must be cleared to indicate that the new page matches the page on disk. When a page is to be paged out, both copies of the bit must be tested to decide if modifications have been made to the page. If either bit is set, the page must be written to disk to record the modifications.

There is still one problem to be solved. Consider the situation in which a page is written, then paged out. Because it is not memory resident, there is no record of it having been modified, yet all pages on disk cannot be assumed dirty or else each and every one would need to be paged in for scanning. A modification to the paging out software that recorded dirty pages written out would provide the necessary information. This record would best be held in exactly the same format as the dirty page map requested by the user process. By holding it in the same format, the map which needs to be returned to the user process is nothing more than the inclusive-or of the map generated by looking through the hardware dirty bits and the paged out map. The paged out map should be cleared whenever a clear request is received. It should not be cleared when a paged out page is paged in.

An interesting way to avoid combining maps and improve paging performance as well is to return the dirty page map and the dirty paged out page maps individually rather than as a single combined map. The benefit comes from the fact that the collector is now given information about which of the dirty pages are probably in physical memory and which are probably on disk. By allowing the collector to order the page scanning in such a way that memory resident pages are scanned first, paging can be minimized. Memory resident pages will not accidentally be paged out to make room for disk resident pages. If pages in the dirty paged out map can be requested to be brought in from disk without causing the collector to wait, even greater gains are possible.

When virtual memory requirements were discussed earlier, the two request mentioned were to clear the dirty bits and to return the dirty page map. For pragmatic reasons it is probably wise to add an additional call that combines both requests into a "return the map and clear the dirty bits" call. The reason for this addition is that operating system calls usually carry a substantial cost in time. Since these calls often occur in close sequence, the ability to combine them may save half of the overhead involved.

As with any general approach to a problem, there are specific cases in which the approach is inappropriate or unnecessary. One must have some understanding of several aspects of a language implementation and the underlying virtual memory system before blindly adopting the method described. It is important to know that virtual memory paging is a substantial expense in the system. If the entire system is memory resident, then the only speedups will come from reducing the base set or heap and the base set. The big benefit of avoiding disruption of the working set will not be seen. If the overhead involved in clearing or requesting the dirty page information is too large (e.g. on systems which either have inefficient system calls or which "page the page table"), or if these actions expose the process to overly expensive rescheduling, much or all of the potential gains may be lost. If the ratio of process size to page size is large, the structures needed to maintain information about page state may become too cumbersome to readily handle. There are, however, some techniques of grouping and encoding that may alleviate this problem.

The key point to understand the various expenses so that a reasonable assessment of the applicability of the method to a given system can be made. It is expected that this method will probably display the largest benefit on single user systems with a simple virtual memory implementation and a large, but not enormous, virtual to physical memory ratio.

While this invention has been described with reference to several preferred embodiments, it is contemplated that various alterations and permutations of the invention will become apparent to those skilled in the art upon a reading of the preceding descriptions and a study of the drawing. It is therefore intended that the scope of the present invention be determined by the following appended claims.

What is claimed is:

1. A method for enhancing data storage efficiency in a virtual memory system including a primary memory and a secondary memory having a plurality of pages where a base set and a heap reside within pages of said primary memory and said secondary memory, and a primary memory dirty page map of said primary memory which indicates when pages in said primary memory have been written to; said method comprising the steps of:

developing a secondary memory dirty page map of said secondary memory;
   developing a saved state map from said primary memory dirty page map;
   utilizing said primary memory dirty page map and said secondary memory dirty page map to determine which pages within the base set have not been written to since said dirty page maps were last cleared, thereby effectively reducing the size of said base set which needs to be utilized by a garbage collection routine by allowing the garbage collection routine to ignore any page in the base set which has not been written to;
   performing said garbage collection routine on at least a segment of said heap based upon said effectively reduced base set; and
   performing a virtual memory routine including writing a first page from said secondary memory to a first page in said primary memory utilizing both said primary memory dirty page map and said saved state map to determine whether or not said first page in said primary memory first needs to be saved to a second page in said secondary memory because it had been written after it came into primary memory.

2. A method for enhancing data storage efficiency in a virtual memory system as recited in claim 1 further comprising the step of dividing said heap into a plurality of segments by said garbage collection routine which are differentiated by their various ages as determined by the number of garbage collection routines said segments had been subjected to, where said garbage collection routine is responsive to the relative ages of the segments of the heap.

3. A method for enhancing data storage efficiency in a virtual memory system as recited in claim 2 wherein said plurality of segments include a new heap, an aging heap and a stable heap.

4. A method for enhancing data storage efficiency by aging data in a memory system including a base set and a heap, where at least a portion of said heap is subjected to a periodic garbage collection routine, said method comprising the steps of:

a. chronologically grouping data comprised of datum which is stored within said heap into a plurality of segments including a new heap having a first designated logical memory space where new data is created, an aging heap which has a second designated logical memory space which is contiguous with said first designated logical memory space for data which has survived at least one garbage collection routine, and a stable heap having a third designated logical memory space which is contiguous with said second designated logical memory space for data which has survived a greater number of garbage collection routines than said aging heap and which is no longer subjected to routine garbage collection, where the boundary between said first designated logical memory space and said second designated logical memory space is designated by a first pointer and where the boundary between said second designated logical memory space and third designated logical memory space is designated by a second pointer, wherein the age of a datum within said heap is imprecisely determined by its inclusion within said new heap, said aging heap or said stable heap rather than by a specific age associated with said datum;
   b. selectively performing said garbage collection routine by removing datum from said new heap and said aging heap which is neither directly nor indirectly referenced by pointers stored within said base set, and by not removing datum from said stable heap; and
   c. repeating steps a. and b.

5. A method for enhancing data storage efficiency in a memory system as recited in claim 4 wherein said aging heap is eventually joined, after at least two garbage collection routines have been performed on said heap, with said stable heap by combining data of said aging heap with said stable heap by changing said second pointer.

6. A method for enhancing data storage efficiency in a memory system as recited in claim 5 wherein said new heap is redefined as said aging heap after said aging heap is joined with said stable heap by changing said first pointer.

7. A virtual memory system for enhancing data storage efficiency comprising:
   primary memory means and secondary memory means, said primary memory means and said secondary memory means collectively including a multiple page base set area and a heap area, where said base set area has references to said heap area;
   primary dirty page map storage means which is capable of being cleared;
   save state map storage means;
   secondary dirty page map storage means which is capable of being cleared;
   means responsive to said primary memory dirty page map storage means and said secondary memory dirty page map storage means for effectively reducing said base set area for garbage collection purposes by determining which pages within said base set area have not been written to since said primary dirty page map storage means and said secondary dirty page map storage means were last cleared;
   garbage collection means responsive to said reduced base set area and operative to remove unreferenced data from said heap area; and
   virtual memory means responsive to said primary dirty page map storage means and said saved state map storage means and operative to manage said primary memory means and said secondary memory means.

8. A virtual memory system as recited in claim 7 wherein said garbage collection means further comprises means for chronologically dividing said heap into a plurality of segments, where said garbage collection means is responsive to the relative ages of said plurality of segments during subsequent garbage collections.

9. A virtual memory system as recited in claim 8 wherein said plurality of segments include a new heap, an aging heap, and a table heap.

* * * * *